(12) United States Patent  
Yeakley et al.

(10) Patent No.: US 8,422,173 B2  
(45) Date of Patent: Apr. 16, 2013

(54) DUAL POLE MAGNET LINEAR ACTUATOR

(75) Inventors: Darryl W. Yeakley, Erie, CO (US); Frank A. Goodknight, Niwot, CO (US)

(73) Assignee: Oracle International Corporation, Redwood City, CA (US)

( * ) Notice: Subject to any disclaimer, the term of this patent is extended or adjusted under 35 U.S.C. 154(b) by 119 days.

(21) Appl. No.: 12/984,751

(22) Filed: Jan. 5, 2011

(65) Prior Publication Data

US 2012/0170153 A1 Jul. 5, 2012

(51) Int. Cl.
*G11B 5/48* (2006.01)
*H02K 41/035* (2006.01)

(52) U.S. Cl.
USPC ............. 360/261.1; 360/241; 310/12.22

(58) Field of Classification Search ........ 360/261.1, 360/241; 310/12.22
See application file for complete search history.

(56) References Cited

U.S. PATENT DOCUMENTS

| | | | | |
|---|---|---|---|---|
| 4,831,291 A * | 5/1989 | Ames | ....................... | 310/13 |
| 4,868,432 A * | 9/1989 | Frandsen | ................. | 310/12.08 |
| 5,434,458 A * | 7/1995 | Stuart et al. | ................. | 310/13 |
| 5,434,549 A * | 7/1995 | Hirabayashi et al. | ......... | 335/229 |
| 5,621,591 A | 4/1997 | Rahimi et al. | | |
| 6,147,422 A * | 11/2000 | Delson et al. | ................. | 310/14 |
| 6,194,796 B1 * | 2/2001 | Yeakley | ......................... | 310/14 |
| 6,236,125 B1 * | 5/2001 | Oudet et al. | ............... | 310/12.26 |
| 6,417,583 B1 * | 7/2002 | Okada | ....................... | 310/12.25 |
| 6,741,151 B1 * | 5/2004 | Livshitz et al. | ............... | 335/222 |
| 7,205,686 B2 * | 4/2007 | Okubo | ........................ | 310/15 |
| 7,218,480 B1 * | 5/2007 | Yeakley et al. | ............ | 360/261.1 |
| 7,439,640 B2 * | 10/2008 | Takeuchi | ................... | 310/12.22 |
| 7,538,980 B2 * | 5/2009 | Harper et al. | ............. | 360/261.1 |
| 2002/0080531 A1 | 6/2002 | Inoguchi et al. | ........... | 360/261.1 |
| 2004/0245861 A1 * | 12/2004 | Miyajima et al. | .............. | 310/12 |
| 2005/0031154 A1 * | 2/2005 | Stiles | ........................... | 381/421 |
| 2008/0256786 A1 * | 10/2008 | Harper | ........................ | 29/602.1 |
| 2012/0170153 A1 * | 7/2012 | Yeakley et al. | ................ | 360/241 |

* cited by examiner

*Primary Examiner* — Brian Miller  
(74) *Attorney, Agent, or Firm* — Brooks Kushman P.C.

(57) ABSTRACT

A dual pole linear actuator includes a dual pole magnet assembly that is moved by providing a bi-directional analog DC control signal to a dual wound coil. The dual pole magnet assembly includes a permanent magnet that is flanked by top and bottom pole pieces. The dual wound coil is assembled to an actuator housing with a top part of the coil being wound in one rotary direction, while the bottom part of the coil is wound in the opposite rotary direction.

15 Claims, 4 Drawing Sheets

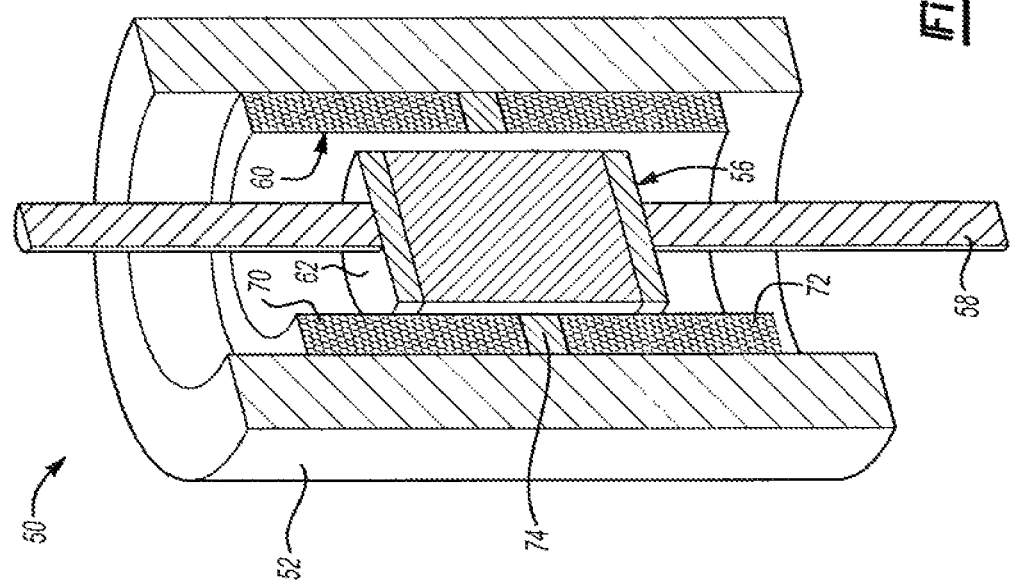
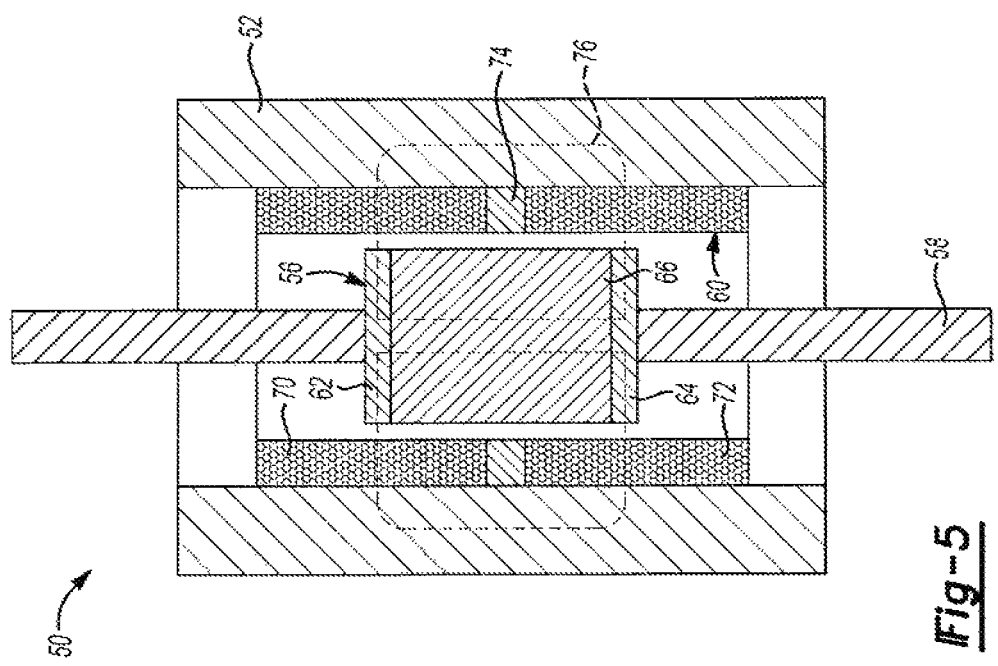

DUAL POLE MAGNET LINEAR ACTUATOR

TECHNICAL FIELD

This invention relates to linear actuators or voice coil actuators that are used to position tape heads in tape data storage machines.

BACKGROUND

Recording head actuators are used to move a tape head in a linear direction. Linear actuators are attached to a read/write head by means of a carriage or other supporting structure. A linear actuator, or voice coil actuator, is a DC actuator that produces linear motion in response to a bi-directional analog control signal.

Conventional voice coil actuators have a coil that is actuated to move a read head, a write head or a combined read/write head in response to an analog signal. In conventional voice coil actuators, the coil is disposed around one pole of a stationary magnet.

Voice coil actuators have a coil that has significant mass in comparison to the mass of the head assembly. The mass of the coil is broadly distributed about the actuation axis of the voice coil actuator. Movement of the coil can result in out-of-plane resonant vibrations. Out-of-plane resonance can cause instability, reduce bandwidth and adversely affect performance of the tape head.

The moving coil of a conventional voice coil actuator may be energized by means of a flexible circuit connection, or flex circuit. A flex circuit attached to a voice coil actuator may add mass to the coil that is asymmetrical relative to the actuation axis. Asymmetrical flex circuit connections may also result in out-of-plane resonances. In addition, flex circuits are subject to fatigue failure caused by repeated cycling of the voice coil actuator.

These and other problems are addressed by Applicants' development as summarized below.

SUMMARY

The linear actuator developed by Applicants is a dual pole magnet assembly. The dual pole magnet is actuated by a stationary dual wound coil. One part of the coil is wound in a clockwise direction and the other part of the coil is wound in a counter-clockwise direction. The coil may be divided into two halves, but also could be divided in unequal parts. Both parts of the coil are energized at the same time and with the same analog actuation current. The stationary dual wound coil provides excitation forces that are applied to both poles of the dual pole magnet. The excitation forces on both of the poles of the actuated dual pole magnet are additive.

The dual pole magnet is actuated by the stationary dual wound coil and has a mass distribution that is narrower than the mass distribution of a conventional voice coil actuator. The likelihood of any detrimental out-of-plane resonances is reduced because the dual pole magnet has a narrower mass distribution that is more closely aligned to the actuation axis. The stationary dual wound coil does not require a flex circuit because it is a stationary coil that is fixedly mounted to the tape deck or other supporting structure for the linear actuator. Because the dual pole magnet is a permanent magnet and is not an electromagnet, there is no need to connect the dual pole magnet to a circuit and there is no need for a flex circuit connector. The symmetry of the dual pole magnet is not adversely affected by the attachment of a flex circuit. In addition, elimination of all flex circuit connectors in the voice coil actuator eliminates the possibility of flex circuit fatigue failures caused by repeated cycling of the voice coil actuator.

According to one aspect of the present invention, a linear actuator is provided that comprises a housing that defines a bore with a cylindrical wall. A coil is fixedly attached to the cylindrical wall of the housing with a first part wound in a clockwise direction and a second part wound in a counter-clockwise direction. The first and second parts of the coil are axially aligned with the cylindrical wall of the housing. In one embodiment, a shaft extends through the bore and is aligned with the axis of the cylindrical wall. A dual pole magnet assembly may be attached to the shaft and disposed within the coil. The magnet assembly includes first and second pole pieces on first and second axial ends of the dual pole magnet.

The two parts of the coil are additive in that they apply a biasing force in the same linear direction on opposite ends of the dual pole magnet. The first part of the coil attracts the first pole piece of the dual pole magnet assembly, while the second part of the coil repels the second pole piece of the dual pole magnet assembly when current is provided to the coil in a first direction. The second part of the coil attracts the second pole piece of the dual pole magnet assembly and the first part of the coil repels the first pole piece of the dual pole magnet assembly when the polarity of the current is reversed. The dual pole magnet assembly has a neutral position in which the dual pole magnet assembly may be centered with the coil, if desired, and the first and second pole pieces are centered with respect to the first and second parts of the coil, respectively.

According to other aspects of the invention as they relate to a linear actuator, the first and second pole pieces are preferably circular disks that are attached to opposite ends of a permanent magnet. A guide shaft may be attached to first and second ends of the dual pole magnet assembly that guides movement of the dual pole magnet assembly along the actuation axis.

These and other aspects of Applicants' invention will be better understood in view of the attached drawings and the following detailed description of the illustrated embodiments.

BRIEF DESCRIPTION OF THE DRAWINGS

FIG. 5 is a cross-sectional view of an alternative embodiment of the dual pole magnet linear actuator; and FIG. 6 is a cross-sectional perspective view of the alternative embodiment of the dual pole magnet linear actuator shown in FIG. 5.

DETAILED DESCRIPTION

Several embodiments of the present disclosure are addressed in this detailed description of the illustrated embodiments. The disclosed embodiments are examples of the invention that may be embodied in various and alternative forms. The figures are not necessarily to scale and some features may be exaggerated or minimized to show details of particular components. The specific structural and functional details disclosed are not to be interpreted as limiting, but merely as a representative basis for teaching one skilled in the art to practice the invention.

Figure 1:
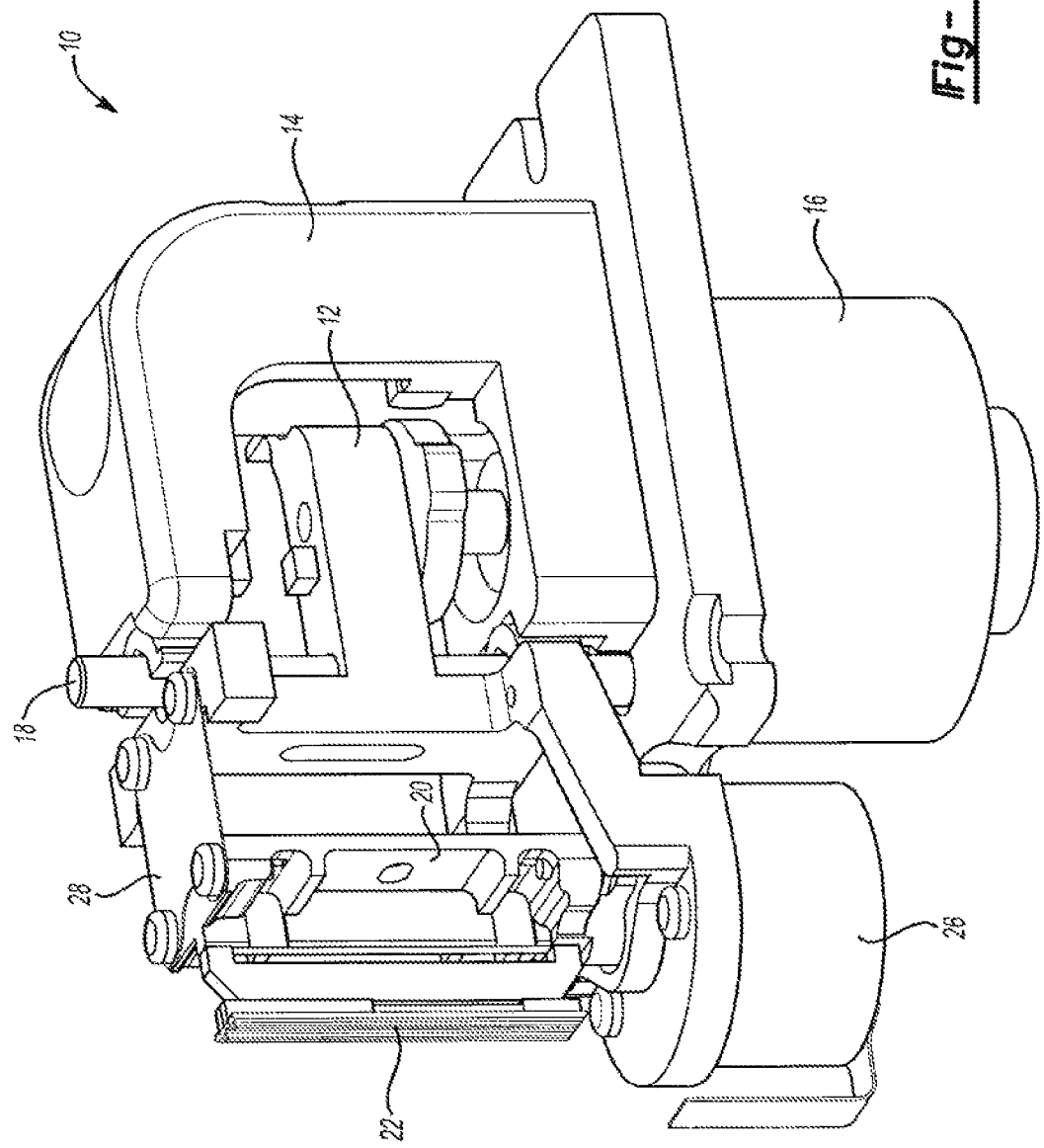
FIG. 1 is a perspective view of a head assembly for a read/write head of a tape drive.

Referring to FIG. 1, a head assembly 10 for a tape drive is shown to include a coarse travel carriage 12 that is attached to a support 14 to be moved by a coarse travel actuator 16. The coarse travel carriage 12 is guided in its movement on a coarse guide shaft 18.

A head carriage 20 is carried by the coarse travel carriage 12 and retains a recording head 22. A dual pole linear actuator 26 moves the head carriage 20 and the recording head 22 to dynamically follow the recording tracks on a recording tape (not shown). Fine guiding flexures 28 secure the head carriage 20 to the coarse travel carriage 12. The fine guiding flexures 28 support the recording head 22 and flex in response to movement induced by the dual pole linear actuator 26.

Figure 2:
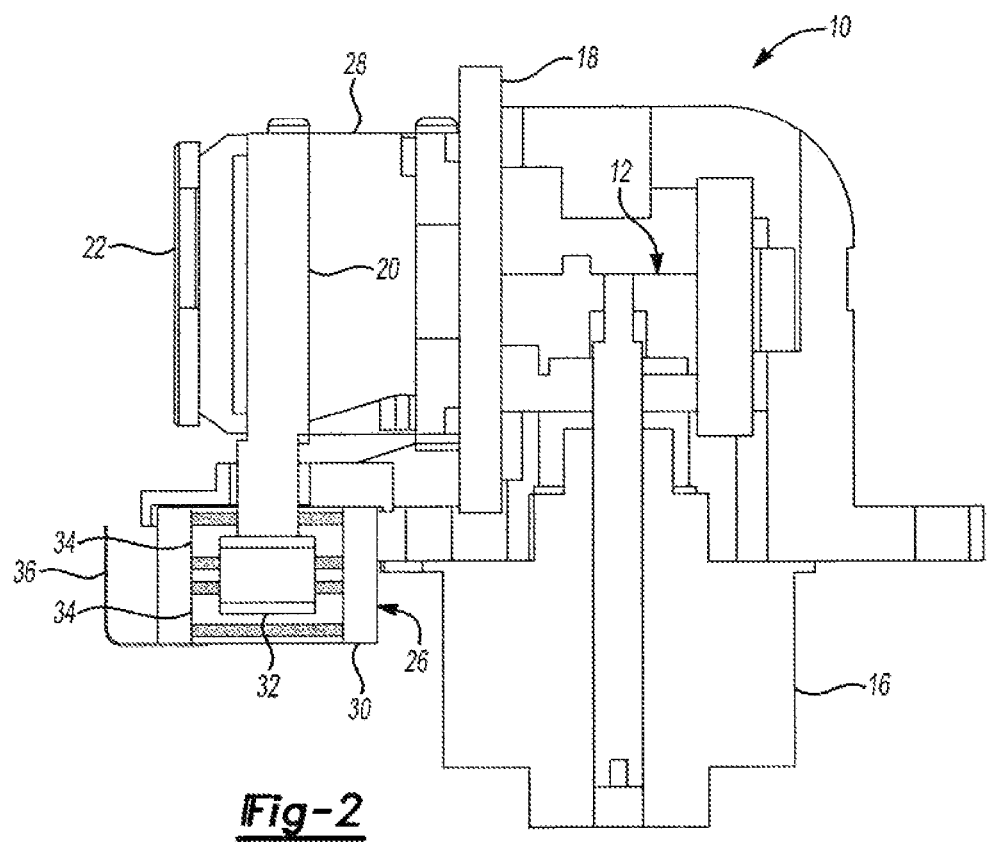
FIG. 2 is a diagrammatic side elevation view of a dual pole magnet linear actuator assembled to a coarse travel actuator.

Referring to FIG. 2, the head assembly 10 is shown to include the coarse travel carriage 12 that is moved by the coarse actuation actuator 16 along the coarse guiding shaft 18. The recording head 22 is moved in the head actuation direction by the dual pole linear actuator 26. The upper and lower ends of the recording head 22 are flexibly retained by the fine guiding flexures 28.

The dual pole linear actuator 26 includes a actuator housing 30. A dual pole magnet assembly 32 is disposed within the steel actuator housing 30 and is moved by energizing a dual wound coil 34. Actuator lead wires 36 are electrically connected and provide current to the dual wound coil 34.

Figure 3:
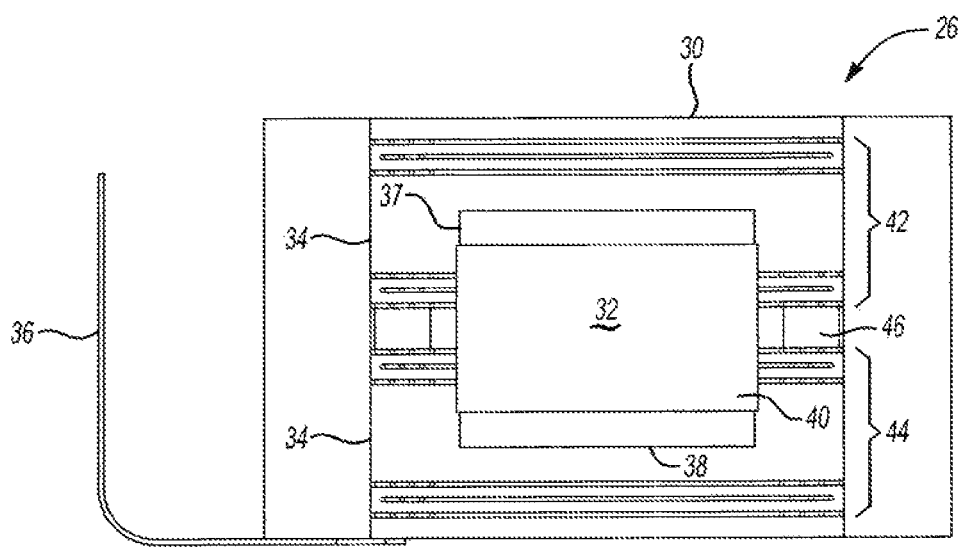
FIG. 3 is a diagrammatic cross-sectional view of a dual pole magnet linear actuator.

Referring to FIG. 3, the dual pole linear actuator 26 is shown in greater detail. The dual pole magnet assembly 32 is shown disposed within the actuator housing 30. The dual wound coil 34 is attached to, or provided within, the actuator housing 30 and receives an analog DC signal through the lead wire connectors 36. The dual pole magnet assembly 32 includes a top pole piece 37 and a bottom pole piece 38 on opposite polar ends of a permanent magnet 40. A top part of the coil 42 is wound in one direction, for example in a clockwise direction, while the bottom part of the coil 44 is wound in the opposite direction, for example in a counter-clockwise direction. The top part 42 and bottom part 44 of the coil 34 may be wound in the opposite rotary direction. A coil spacer 46 is disposed between the top part of the coil 42 and the bottom part of the coil 44. The coil spacer 46 functions to separate the top and bottom parts of the coil 42 and 44.

Figure 4:
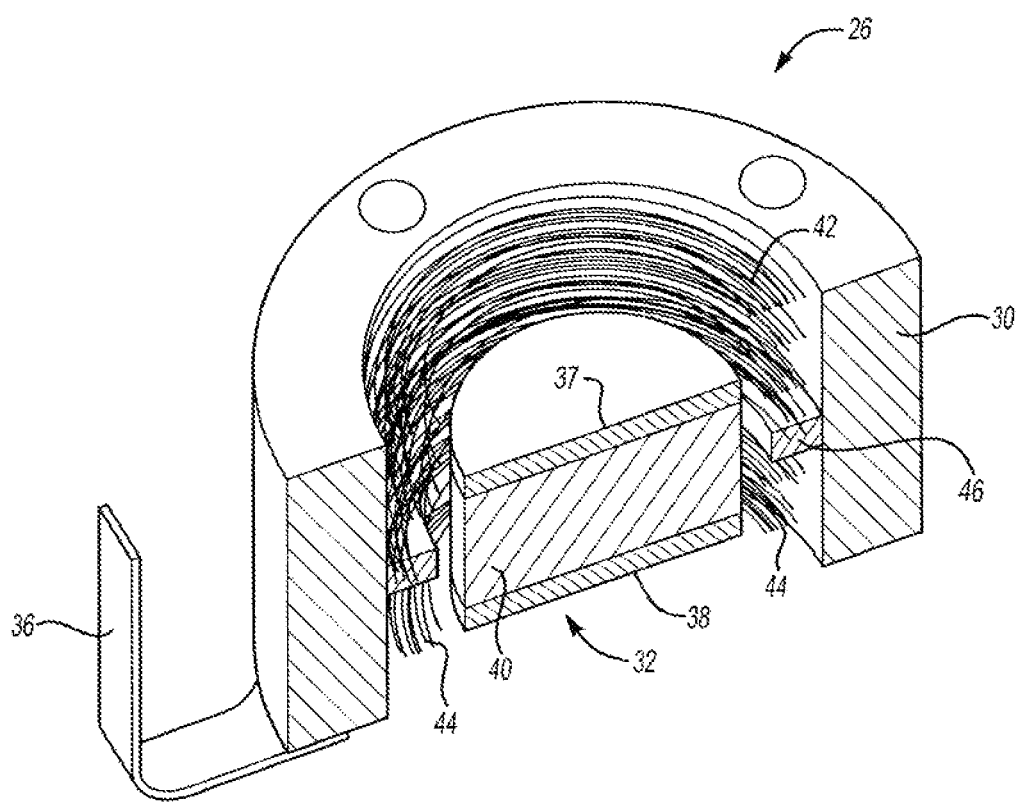
FIG. 4 is a cross-sectional perspective view of a dual pole magnet linear actuator.

Referring to FIG. 4, the dual pole linear actuator 26 is shown to include the actuator housing 30 and dual pole magnet assembly 32. The dual pole magnet assembly 32 includes the permanent magnet 40 and is flanked by the top pole piece 37 and the bottom pole piece 38. The dual pole magnet assembly 32 is shown centered within the actuator housing 30 with the top pole piece 37 and bottom pole piece 38 centered relative to the top part of the coil 42 and bottom part of the coil 44, respectively. The spacer 46 is disposed between the top part of the coil 42 and the bottom part of the coil 44. The permanent magnet 40 may be centered relative to the spacer 46 in its neutral position.

In operation, the dual pole linear actuator 26 in the embodiment of FIGS. 1-4 is moved in the head actuation direction when an analog DC current is supplied to the dual wound coil 34. The top part of the coil 42, for example, may attract the top pole piece 37 while the bottom part of the coil 44 repels the bottom pole piece 38 to move the dual pole magnet assembly 32 in the same linear direction. In this way, the forces applied to the dual pole magnet assembly 32 are additive.

Referring to FIGS. 5 and 6, an alternative embodiment of the dual pole linear actuator 50 is shown to include a actuator housing 52 and a dual pole magnet assembly 56 within the actuator housing 52. A guide shaft 58 extends axially from opposite sides of the dual pole magnet assembly 56. The guide shaft 58 guides movement of the dual pole magnet assembly 56 as it moves in the head actuation direction, or axially, relative to the actuator housing 52. A dual wound coil, generally indicated by reference numeral 60, is assembled to the inner cylindrical wall of the actuator housing 52. The dual wound coil 60 is energized to move the dual pole magnet assembly 56 by acting on the top pole piece 62 and the bottom pole piece 64. The pole pieces 62 and 64 flank the permanent magnet 66. The top part of the coil 70 may be wound in a clockwise direction, while the bottom part of the coil 72 may be wound in a counter-clockwise direction. The top part 70 and the bottom part 72 of the coil 60 may be wound in the opposite rotary direction. A spacer 74 separates the top part of the coil 70 and the bottom part of the coil 72.

As shown in phantom lines in FIG. 5, a flux path 76 is shown in a simplified manner to illustrate how the flux path is believed to flow between the dual pole magnet assembly 56 and the dual wound coil 60.

In operation, the dual pole linear actuator 50, shown in FIGS. 5 and 6, is moved in the head actuation direction by energizing the dual wound coil 60 with the top part 70 of the coil 60 and the bottom part 72 of the coil 60 being attracted and repelled, respectively, when current is provided to the coil. The current is a DC current that may be reversed in polarity to cause the dual wound coil 60 to shift the dual pole magnet assembly 56 relative to the actuator housing 52 in opposite axial directions.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A linear actuator, comprising:
   a housing that defines an opening that has an inner wall, wherein the housing provides a magnetic return path for controlling the flux;
   a coil fixedly attached to the inner wall of the housing, the coil having a first part that is wound in a first rotary direction and a second part that is wound in a second rotary direction, the first part and second part are axially aligned on the inner wall; and
   a dual pole magnet assembly is disposed within the coil, the dual pole magnet assembly includes a first pole piece on a first axial end of the magnet and a second pole piece on a second axial end of the magnet, wherein the first and second pole pieces concentrate the flux.

2. The linear actuator of claim 1 wherein the first and second pole pieces are disks and the magnet is a permanent magnet.

3. The linear actuator of claim 1 wherein the first part of the coil attracts the first pole piece of the magnet assembly and the second part of the coil repels the second pole piece of the magnet assembly when current is provided to the coil in a first direction, and wherein the second part of the coil attracts the second pole piece of the magnet assembly and the first part of the coil repels the first pole piece of the magnet assembly when the polarity of the current is reversed.

4. The linear actuator of claim 1 wherein the magnet assembly has a neutral position in which the magnet assembly is within the coil and the first and second pole pieces are adjacent with the first part and second part of the coil, respectively.

5. The linear actuator of claim 1 further comprising a guide shaft attached to the dual pole magnet assembly.

6. The linear actuator of claim 5 wherein the guide shaft extends from two opposite ends of the dual pole magnet assembly.

7. The linear actuator of claim 1 further comprising at least one fine guiding flexure that supports a recording head and flexes in response to movement induced by the current supplied to the coil.

8. A head assembly comprising:
a head;
a head carriage supporting the head;
a dual pole linear actuator operatively connected to the head carriage for moving the head in a head actuation direction, the dual pole linear actuator including:
an electromagnetic coil having a first part coil wound in one direction and a second part coil wound in the opposite direction from the one direction, the first and second part coils being axially aligned with each other and attached to a housing that provides a magnetic return path; and
a dual pole magnet assembly with a permanent magnet and a first pole piece and a second pole piece disposed on opposite polar ends of the permanent magnet for concentrating flux in the dual pole magnet assembly, wherein the dual pole magnet assembly is disposed within the electromagnetic coil and is actuated to move in the head actuation direction when current is provided to the electromagnetic coil thereby moving the head in the head actuation direction.

9. The head assembly of claim 8 further comprising a housing that defines an opening within which the electromagnetic coil is secured and the dual pole magnet assembly is disposed.

10. The head assembly of claim 8 wherein the dual pole magnet assembly is operatively connected to a guiding flexure that normally holds the dual pole magnet assembly in a centered position relative to the electromagnetic coil.

11. The head assembly of claim 10 wherein the dual pole magnet assembly is moved in one linear direction by current flowing with one polarity and in a second linear direction by current flowing with a second polarity.

12. The head assembly of claim 11 wherein the head is moved in the one linear direction or the second linear direction depending upon the polarity of the current provided to the electromagnetic coil.

13. The head assembly of claim 8 wherein the dual pole magnet assembly is attached to a guide shaft that is aligned with the head actuation direction.

14. The head assembly of claim 8 wherein the head carriage is attached to a coarse travel carriage that is moved by a coarse actuation motor along a coarse guide shaft.

15. The head assembly of claim 8 further comprising a spacer disposed between the first and second part coils.

* * * * *